United States Patent [19]

Roberts

[11] Patent Number: 5,359,263
[45] Date of Patent: Oct. 25, 1994

[54] TUNED LRC BALLASTING CIRCUIT FOR COMPACT FLUORESCENT LIGHTING

[75] Inventor: Gary D. Roberts, Riverton, Utah

[73] Assignee: RemTech Company, Lindon, Utah

[21] Appl. No.: 979,765

[22] Filed: Nov. 20, 1992

[51] Int. Cl.$^5$ ............................................. H01J 7/44
[52] U.S. Cl. ........................................ 315/58; 315/62; 315/244; 315/DIG. 5; 315/DIG. 7
[58] Field of Search ................ 315/58, 62, 243, 244, 315/219, 227 R, 283, 291, DIG. 5, DIG. 7; 313/634

[56] References Cited

U.S. PATENT DOCUMENTS

| | | | |
|---|---|---|---|
| 3,710,177 | 1/1973 | Ward | 315/DIG. 5 X |
| 4,270,071 | 5/1981 | Morton | 315/62 |
| 4,608,523 | 8/1986 | Nilsson | 315/244 |
| 4,996,462 | 2/1991 | Krummel | 315/244 X |
| 5,013,977 | 5/1991 | Droho | 315/244 X |

Primary Examiner—Robert J. Pascal
Assistant Examiner—Haissa Philogene
Attorney, Agent, or Firm—Robert B. Crouch

[57] ABSTRACT

The present invention offers improvement of performance and efficiency of a compact fluorescent lamp by means of a series tuned LRC ballasting circuit. The resonant voltage rise in the circuit is utilized to increase the cyclic crest voltage necessary for lamp ionization. After ionization occurs, lamp current and power are clamped and regulated by the lower Q factor of the tuned circuit. The LRC circuit provides a square wave of voltage across the lamp with considerable reduction in noise and RF ringing. Since it is a tuned circuit, it operates at approximately unity power factor, at lower temperature, and with a net equivalent impedance that provides for maximum illumination, lamp life and efficiency.

1 Claim, 1 Drawing Sheet

TUNED LRC BALLASTING CIRCUIT FOR COMPACT FLUORESCENT LIGHTING

The present invention relates to means for improving the performance and effective life of a compact fluorescent lamp.

BACKGROUND OF THE INVENTION

Dramatic improvements have occurred in lighting technologies in response to the continuing demands of society for increased efficiency in utilization of energy. As a result, products have reached the market which create increased illumination with extended life. One of the more recent of these improved technologies which has received wide acceptance is the compact fluorescent lamp. Many businesses have realized significant energy savings simply by retrofitting their existing lighting systems with compact fluorescent lamps and fixtures.

While the energy requirements of fluorescent lamps are only 25 to 35 percent of those of incandescent lamps for comparable levels of illumination, there are undesireable characteristics inherent in their operation, such as, low power factor and excessive heat generation. Conventional compact fluorescent lamps operate within a narrow range of tolerances, in that, a substantial level of applied voltage is required to initiate and sustain operation of the lamp, which, in accordance with Ohm's Law, results in significant levels of current and consequent heat. Since the ability of the lamp to produce suitable illumination is degraded with heat, it is desireable to reduce the current. This presents a dilemma, since voltage, which varies directly with current, cannot be reduced appreciably without interrupting operation of the lamp. The present compact fluorescent lamps are, therefore, heat sensitive, in that, they operate at temperatures which produce acceptable levels of illumination, but as overheating occurs, the level of illumination produced degrades sharply. This problem has become so pervasive that compact fluorescent lamps are now being fitted with metal heat sinks in an effort to radiate heat from the body of the lamp to minimize reduction in the level of lumens produced.

SUMMARY OF THE INVENTION

The present invention overcomes the problems associated with prior art compact fluorescent lamps by provision of a ballasting circuit which allows compact fluorescent lamps to operate at lower temperatures and with near optimum efficiency. The present ballasting circuit includes a series-tuned LRC circuit in which the value of the capacitance is sized to match and neutralize the inductance, thus providing a tuned resonant circuit at a predetermined frequency. When properly tuned, the LRC circuit operates near its point of resonance. As resonance is approached, the total impedance of the circuit is progressively reduced and the series current is progressively increased. This increase in current causes the voltage across the capacitance to exceed the applied voltage. The voltage of L and C are equal but opposite in polarity at resonance and the voltage of R is equal to the applied voltage, therefore the voltages of both L and C are much greater than the applied voltage. This resonant voltage rise is used in the ballasting circuit as a means of increasing the level of cyclic crest voltage available for prompt ionization of the fill gas. When the fill gas has reached the plasma or conducting state, both lamp current and power are regulated by the low Q of the ballasting circuit, since it has been tuned for a frequency slightly below or above its point of resonance.

The LRC ballasting circuit operates with a more efficient power wave form by producing a regulated pseudo-square wave of voltage across the cathodic emitters of the lamp. This reduces surge current at the outset of each conduction cycle and holds or maintains an optimum level of near steady-state current to operate the lamp. This regulation of cathodic current softens any deleterious fluctuations in the ion plasma stream, reduces RF noise and ringing, curbs the deterioration of lamp cathodes, and maintains operation over a broader range of supply voltage variations. Since it is a tuned circuit, it operates at substantially unity power factor, significantly lower temperature, and with a net equivalent impedance that allows maximization of illumination and efficiency for each half cycle of applied A C voltage.

DRAWING

The best mode presently contemplated of carrying out the invention will be understood from the detailed description of the preferred embodiments illustrated in the accompanying drawing in which.

DETAILED DESCRIPTION

Figure 1:
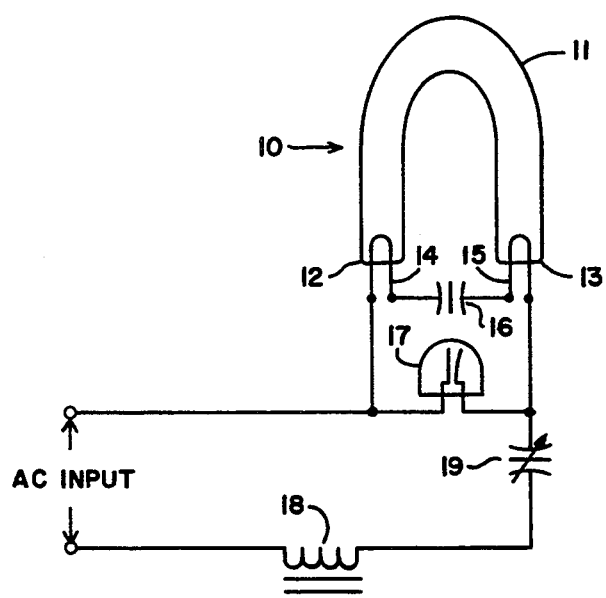
FIG. 1 is a circuit diagram of a ballasting circuit shown in connection with a compact fluorescent lamp.

Referring more particularly to FIG. 1 of the drawing, a compact fluorescent lamp is illustrated at 10 as including a glass tube 11 which is bent back upon itself to dispose the ends 12 & 13 closely adjacent each other. The ends of the tube are sealed and each contains a cathodic emitter 14, 15 mounted therein and extending into the interior of the tube. The two cathodic emitters 14, 15 are electrically connected in series with a small capacitor 16, while an igniter switch 17 is connected in parallel with the capacitor 16. An inductive reactor (ballast) 18 and a variable capacitance 19 are connected in series with the cathodic emitters and the circuit is energized from an A C input as shown. Each emitter includes a resistor for heating a filament which is coated with emissive material which gives off electrons when heated. The igniter is typically a small gas-filled tube containing a bi-metallic switch.

In a typical compact fluorescent lamp construction, the interior of the glass tube 11 is coated with fluorescent minerals or phosphors which transform ultraviolet radiation into visible light. The tube is filled with an inert gas which includes a limited amount of mercury vapor. When a high voltage is applied to the cathodic emitters 14, 15, an arc is created in the gas which excites the mercury vapor to cause ultraviolet radiation. The ultraviolet light, which is nearly invisible to the human eye, activates the phosphors which coat the interior surface of the tube, to cause visible light. Unlike incandescent lamps, the filaments or cathodic emitters do not give off light. Instead, their function is to initiate the ionization process, and the resulting arc, by emitting electrons into the gas mixture when heated by the application of voltage from the A C input. Initiation of the ionization process requires a momentary high potential which is produced by breaking an inductive circuit. After the arc is started, the heating current is interrupted. These functions are provided by the ballast which limits the lamp current to the proper value, provides the proper voltage across the cathodic emitters, and provides the voltage spike necessary to start the arc. In the operation of the circuitry of FIG. 1, the capacitor 16 limits the current flowing through emitters 14, 15 and creates a voltage potential across the igniter 17 which heats the bi-metal switch until it closes. When the igniter switch closes, the capacitor 16 is bypassed and the magnetic field in the inductive reactor is released and applied through the emitters to fire the lamp. The igniter switch then opens and the current through the emitters is again limited by the capacitor.

In a series circuit containing inductance and capacitance, the capacitive reactance $X_C$ is opposite in its effect to the inductive reactance $X_L$, so that one tends to neutralize the other and the total reactance is $X_C-X_L$. Since the inductive reactance $X_L$ increases, and the capacitive reactance $X_C$ decreases, as the frequency is increased, it is possible, by varying the frequency of the circuit, to obtain a condition such that $X_L=X_C$. When this occurs, the capacitive reactance $X_C$ is exactly neutralized by the inductive reactance $X_L$ so that the relation for current and voltage becomes $E=I\sqrt{R^2+(X_L X_C)^2}=I\ R$ and the current which flows is determined entirely by the resistance of the circuit. Whenever, in a series circuit, $X_L=X_C$, the circuit is said to be in resonance and the frequency at which this occurs is referred to as the resonant frequency. Resonance can be obtained by varying the frequency or can be produced at any fixed value of frequency by varying the capacitance or the inductance in such a manner as to make $X_L=X_C$. Circuits containing inductance and capacitance in series, i.e., LRC series circuits, are very likely to have excessive voltages across some part of the circuit even if they are not operated at the resonant frequency. The amount of resistance in the circuit influences the voltage across the various parts and, at resonance, the current is limited only by the resistance.

The present invention takes advantage of the characteristics of a series tuned LRC circuit to provide a ballasting circuit which enables the level of voltage supplied to a compact fluorescent lamp to be substantially increased without a corresponding increase in current consumed by the lamp. By adjusting the variable capacitance 19, the present ballasting circuit can be tuned to a frequency where the capacitive reactance of the circuit essentially neutralizes the inductive reactance and the lamp operates at essentially unity power factor. A frequency is selected which is near an edge of what can be referred to as the resonance band width. At the center of this band width, $X_C=X_L$ and the effective voltage across the capacitance equals that across the inductance and both are at the maximum level. However, at a frequency slightly higher or slightly lower than the resonant frequency, the voltages across the capacitance and the inductance are not equal and are somewhat below the maximum. At such frequency, the lamp operates at essentially unity power factor without the risk of resonant failure. At this point, since it is a tuned circuit, the ballasting circuit operates as a band pass filter, in that, it only allows passage of the frequency for which it is tuned. Due to the characteristics of an LRC circuit a frequency can be selected near an edge of the resonant band width wherein the applied voltage is 120 volts but the capacitive and inductive voltages are approximately 220 volts which is actually applied across the gas tube, resulting in the tube being charged to approximately 150 volts. As a consequence, the arc is created faster, the level of lumens produced is greater and the effective life of the lamp is increased.

Figure 2A:
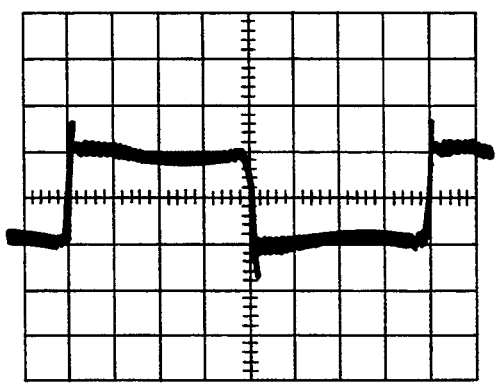
FIGS. 2a and 2b are oscilloscope traces of tube voltage of the present device and a conventional lamp, respectively.
Figure 2B:
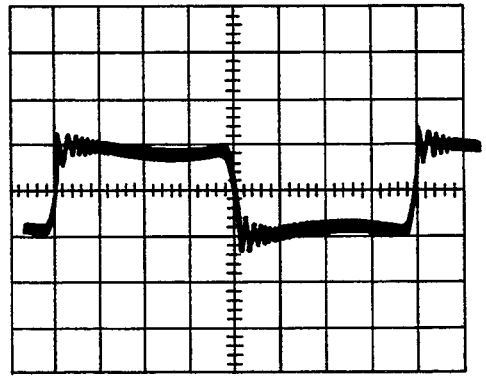
Figure 3A:
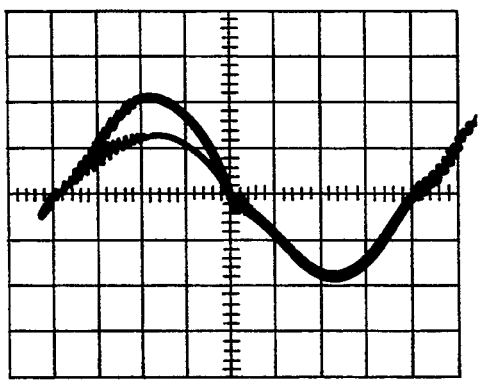
FIGS. 3a and 3b are oscilloscope traces of emitter heater voltage of the present device and a conventional lamp, respectively.
Figure 3B:
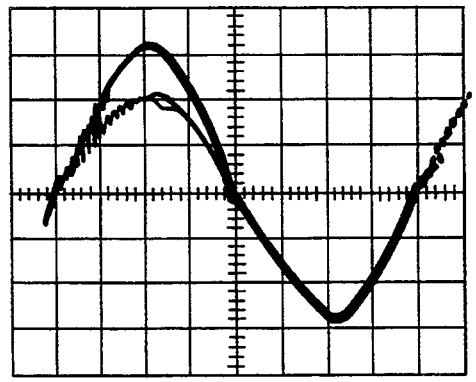

The oscilloscope traces of FIG. 2a illustrate the regulated pseudo-square wave of voltage across the emitters of the present invention. When compared with the corresponding wave forms of a conventional lamp shown in FIG. 2b, it can be seen that the envelope of the wave of FIG. 2a is more linear than that of FIG. 2b and the trailing edge has a sharper transition, in that it is closer to vertical than that of FIG. 2b. The differences between individual waves are small, but since they are repeated at the rate of 120 times per second, the cumulative effect on performance of the lamp becomes significant. The ideal condition for compact fluorescent lamp operation is to maintain a sheath of electrons around the emitters to protect them from the erosive bombardment of hot ionic plasma. High frequency currents generated by electronic ballasts and modulations in the current plasma stream of conventional ballasts produce attenuation of the electron sheathing and subject the emitters to premature erosion and reduced life. The more efficient power wave form of the present invention softens deleterious fluctuations in the ion plasma stream and curbs deterioration of the emitters. The cyclic crest voltage shown at the leading edges of the wave forms of FIG. 2a is substantially greater, approximately 23%, in comparison with the trace of FIG. 2b. This increase in voltage derives from the resonant voltage rise of the series tuned LRC circuit. Since the crest voltage is increased, the emitters do not have to be heated to the degree required in conventional lamps so the operating temperature of Applicant's lamp is reduced below that typically experienced. This is illustrated in FIG. 3a which shows approximately 33% reduction in the voltage applied to the emitters as compared with FIG. 3b Conventional compact fluorescent lamps operate with very poor power factor, even with the small capacitor in the circuit, which typically is in the range of 65-70%. The capacitor has only slight effect on the power factor since it selected to limit the current through the emitters and activate the igniter.

The present invention provides up to 40% improvement in the level of lumens produced and/or the operating temperature. In addition, the noise and RF ringing of the lamp are significantly reduced and the effective life is extended.

While the invention has been described with reference to specifically illustrated preferred embodiments, it should be realized that various changes may be made without departing from the disclosed inventive subject matter particularly pointed out and claimed herebelow.

I claim:

1. A fluorescent lamp which includes an elongated tube having a pair of cathodic emitters mounted therein and means for igniting the emitters, a series-resonant ballasting circuit which remains in resonance and operates at essentially unity power factor both during and after lamp ignition connected in series with both emitters, said ballasting circuit including a series-connected inductance and capacitance which remain fully operative in the circuit during and after lamp ignition, said capacitance being sized to match and neutralize said inductance.

* * * * *